United States Patent
Kooman

(10) Patent No.: US 9,032,446 B2
(45) Date of Patent: May 12, 2015

(54) SYSTEM AND METHOD FOR FACILITATING PURCHASES ASSOCIATED WITH VIDEO PROGRAMMING

(75) Inventor: Christopher Kooman, Englewood, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 718 days.

(21) Appl. No.: 12/509,034

(22) Filed: Jul. 24, 2009

(65) Prior Publication Data

US 2011/0023067 A1    Jan. 27, 2011

(51) Int. Cl.
*H04N 5/445* (2011.01)
*H04N 21/435* (2011.01)
*H04N 5/44* (2011.01)
*H04N 7/173* (2011.01)
*H04N 21/235* (2011.01)
*H04N 21/2389* (2011.01)
*H04N 21/41* (2011.01)
*H04N 21/422* (2011.01)
*H04N 21/434* (2011.01)
*H04N 21/44* (2011.01)
*H04N 21/478* (2011.01)
*H04N 21/858* (2011.01)

(52) U.S. Cl.
CPC .......... *H04N 21/435* (2013.01); *H04N 5/4403* (2013.01); *H04N 7/17318* (2013.01); *H04N 21/235* (2013.01); *H04N 21/23892* (2013.01); *H04N 21/4126* (2013.01); *H04N 21/42204* (2013.01); *H04N 21/4348* (2013.01); *H04N 21/44008* (2013.01); *H04N 21/47815* (2013.01); *H04N 21/858* (2013.01); *H04N 2005/4414* (2013.01); *H04N 2005/443* (2013.01)

(58) Field of Classification Search
USPC .......................................................... 725/60
See application file for complete search history.

(56) References Cited

U.S. PATENT DOCUMENTS

| 5,410,326 | A | 4/1995 | Goldstein | |
| 6,002,450 | A | 12/1999 | Darbee et al. | |
| 6,278,499 | B1 | 8/2001 | Darbee et al. | |
| 7,725,362 | B2 * | 5/2010 | Weathers, Jr. | 705/26.8 |
| 8,046,803 | B1 * | 10/2011 | Lee | 725/60 |
| 8,589,984 | B1 * | 11/2013 | Acharya et al. | 725/60 |
| 2002/0029387 | A1 | 3/2002 | Nishikawa | |
| 2002/0104095 | A1 * | 8/2002 | Nguyen et al. | 725/110 |
| 2005/0001613 | A1 | 1/2005 | Blossfeld | |

(Continued)

FOREIGN PATENT DOCUMENTS

WO    2005/001613    A2    1/2005

OTHER PUBLICATIONS

First Official Action for corresponding Canadian Application No. 2768038, mailed Dec. 30, 2013; 2 pages.

(Continued)

*Primary Examiner* — Nicholas Corbo
(74) *Attorney, Agent, or Firm* — Seed IP Law Group PLLC

(57) ABSTRACT

A method for facilitating a purchase associated with video programming is provided. The method includes detecting a product signal related to video programming, and activating an indicator within a user interface in a remote control in response to the product signal. The method also includes placing a product corresponding to the product signal within a selected item list in response to an activation of an input selector within the user interface of the remote control.

23 Claims, 9 Drawing Sheets

(56) References Cited

U.S. PATENT DOCUMENTS

2006/0048192 A1* 3/2006 Averbuch .................. 725/60
2006/0288374 A1 12/2006 Ferris et al.
2007/0039020 A1 2/2007 Cansler, Jr. et al.
2007/0156521 A1* 7/2007 Yates ......................... 705/14
2008/0134255 A1 6/2008 Ferris et al.
2008/0281684 A1* 11/2008 Stefanik et al. ............ 705/14
2010/0107193 A1* 4/2010 Manthoulis et al. ........ 725/34

OTHER PUBLICATIONS

International Preliminary Report on Patentability for corresponding International Application No. PCT/US2010/042906; 7 pages.
International Search Report for corresponding International Application No. PCT/US2010/042906; 3 pages.

* cited by examiner

SYSTEM AND METHOD FOR FACILITATING PURCHASES ASSOCIATED WITH VIDEO PROGRAMMING

TECHNICAL BACKGROUND

Many current video programs, such as movies and television shows, include product placements. These product placements are sought by companies looking to showcase their products in a setting other than a traditional commercial. Seeing characters in a movie or television show using products often increases the later sales of these products.

However, for many products the viewer does not necessarily know how to go about purchasing the product. Some products may be available only in limited quantities or through limited sellers, and unless a traditional commercial follows the product placement, a viewer may not be able to find and purchase the product. This is especially true in rural areas where the product is found only in stores a large distance away from the viewer.

Overview

In various embodiments, methods and systems are provided for facilitating purchases associated with video programming. In an embodiment, a system for facilitating purchases associated with video programming is provided. The method includes an electronic device configured to send video programming to a display and a remote control. The remote control includes a remote control processing system, and a user interface coupled with the remote control processing system configured to receive commands from the remote control processing system, and to send commands to the remote control processing system.

The remote control also includes a receiver coupled with the remote control processing system and configured to receive commands from the electronic device and send the commands to the remote control processing system. The remote control further includes a transmitter coupled with the remote control processing system and configured to receive commands from the remote control processing system and to send the commands to the electronic device.

The user interface includes an indicator and an input selector both coupled with the remote control processing system. The electronic device is configured to detect a product signal related to the video programming corresponding to a product associated with the video programming, transmit a purchase opportunity command to the remote control in response to the product signal, receive a purchase command from the remote control, and place the product in a selected product list in response to the purchase command.

The remote control processing system is configured to receive the purchase opportunity command from the electronic device through the receiver, activate the indicator in the user interface in response to the purchase opportunity command, and transmit a purchase command through the transmitter to the electronic device in response to an activation of the input selector.

In another embodiment, an electronic device for facilitating purchases associated with video programming is provided. The electronic device includes an electronic device processing system, and a receiver coupled with the electronic device processing system, configured to receive commands from a remote control. The electronic device also includes a transmitter coupled with the electronic device processing system, configured to transmit commands to the remote control, and an output port coupled with the electronic device processing system, configured to send video programming to a display.

The electronic device processing system is configured to detect a product signal related to the video programming corresponding to a product associated with the video programming, and to transmit a purchase opportunity command to the remote control in response to the product signal through the transmitter. The electronic device processing system is also configured to receive a purchase command from the remote control through the receiver, and to place the product in a selected product list in response to the purchase command.

In a further embodiment, a remote control for facilitating purchases associated with video programming is provided. The remote control includes a remote control processing system, and a user interface coupled with the remote control processing system. The remote control also includes a receiver coupled with the remote control processing system configured to receive commands from an electronic device and send the commands to the remote control processing system, and a transmitter coupled with the remote control processing system configured to receive commands from the remote control processing system and send the commands to the electronic device.

The user interface includes an indicator and an input selector. The remote control processing system is configured to receive a purchase opportunity command from the electronic device through the receiver, to activate the indicator in response to the purchase opportunity command, and to transmit a purchase command to the electronic device through the transmitter in response to an activation of the input selector.

In another embodiment, a method for facilitating a purchase associated with video programming is provided. The method includes detecting a product signal related to video programming, and activating an indicator within a user interface in a remote control in response to the product signal. The method also includes placing a product corresponding to the product signal within a selected item list in response to an activation of an input selector within the user interface of the remote control.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
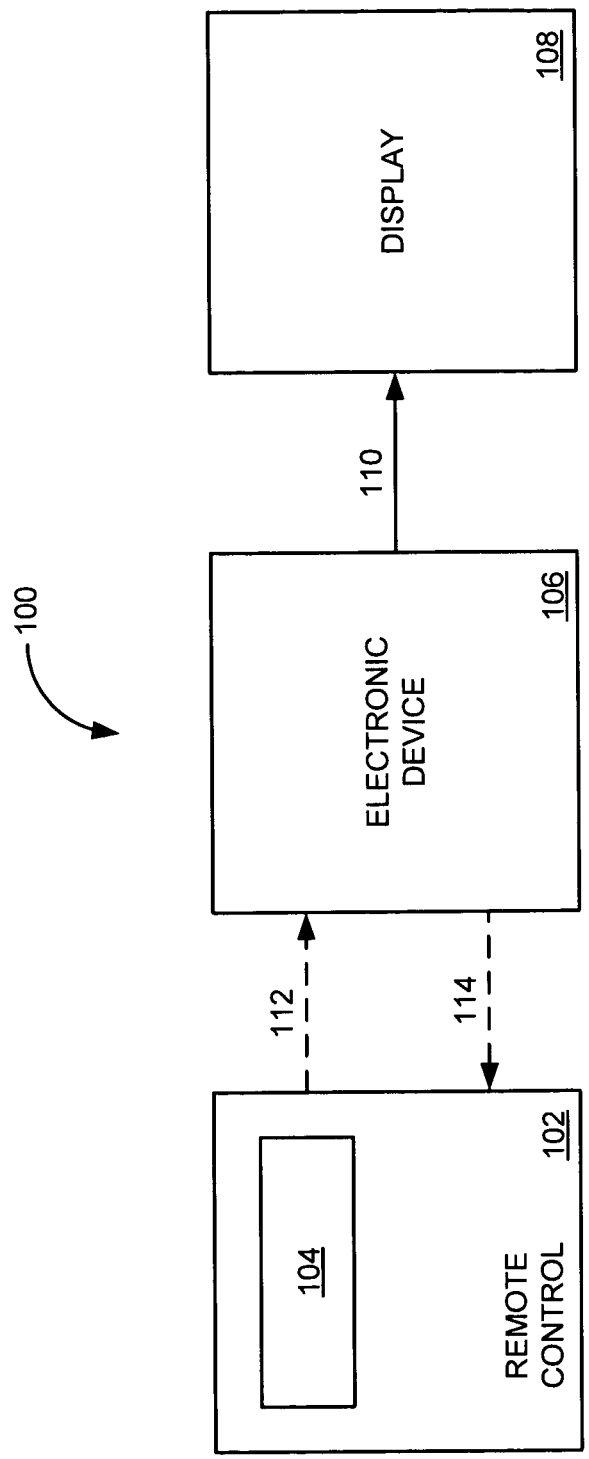
FIG. 1 is a block diagram illustrating a system for facilitating purchases associated with video programming.

FIG. 1 is a block diagram illustrating a system 100 for facilitating purchases associated with video programming. This example system 100 for facilitating purchases includes remote control 102, electronic device 106, and display 108. Remote control 102 includes user interface 104. User interface 104 may include any of a wide variety of output indicators or displays, along with input components such as buttons, touch screens, and the like.

In this example, remote control 102 transmits commands to electronic device 106 over link 112, and receives commands from electronic device 106 over link 114. Electronic device 106 sends video programming to display 108 over link 110. Links 112 and 114 are often wireless links such as infrared (IR) or radio frequency (RF) links. Link 110 is often a wired link using a cable to transmit video from electronic device 106 to display 108.

Remote control 102 may be any device capable of transmitting commands to electronic device 106 and receiving commands from electronic device 106. Electronic device 106 may be any device capable of sending video programming to display 108, transmitting commands to remote control 102, and receiving commands from remote control 102. Some examples of electronic device 106 include DVD players, Blu-Ray disc players, television set-top boxes, and the like. Display 108 may be any device capable of displaying video programming, such as a television set, computer monitor, or the like.

In this example, user interface 104 includes an indicator and an input selector. The indicator may be any device capable of indicating an activation of the indicator to a user. For example, the indicator may be a liquid crystal display, a light emitting diode, or the like. The input selector may be a touch screen, a button, or other device capable of being activated.

Electronic device 106 transmits video programming to display 108. At some point during the video programming, electronic device 106 detects a product signal in or related to the video programming. This product signal may take any of a wide variety of forms. It may be a signal included in the actual video programming (such as a video or audio signal not discernable to the viewer), data associated with the video programming as metadata, or data (such as timestamp data) associated with the video programming as separate data. The product signal may be used to signal the electronic device that a product placement is occurring at the present point in the video programming. The product signal may be a single signal including a length of time during which it is valid, or may be present within the video program for the length of time.

When electronic device 106 detects the product signal, it transmits a purchase opportunity command to the remote control in response to the product signal. Remote control 102 then receives the purchase opportunity command and in response activates the indicator in user interface 104. This indicator signals the user that they have an opportunity to purchase the product associated with the video programming. If the user decides to purchase the product they may activate the input control on user interface 104 of remote control 102. In response to the activation of the input control, remote control 102 transmits a purchase command to electronic device 106.

When electronic device 106 receives the purchase command from remote control 102 it places the product corresponding to the purchase command in a selected product list. This selected product list may be an electronic shopping cart, or other similar structure allowing the user to purchase the product using a credit card, PayPal™, or other billing method.

In some embodiments, the product may be made available for purchase anytime after the indicator has been activated, while in other embodiments the product may be made available for purchase only during the time that the indicator is active.

Figure 4:
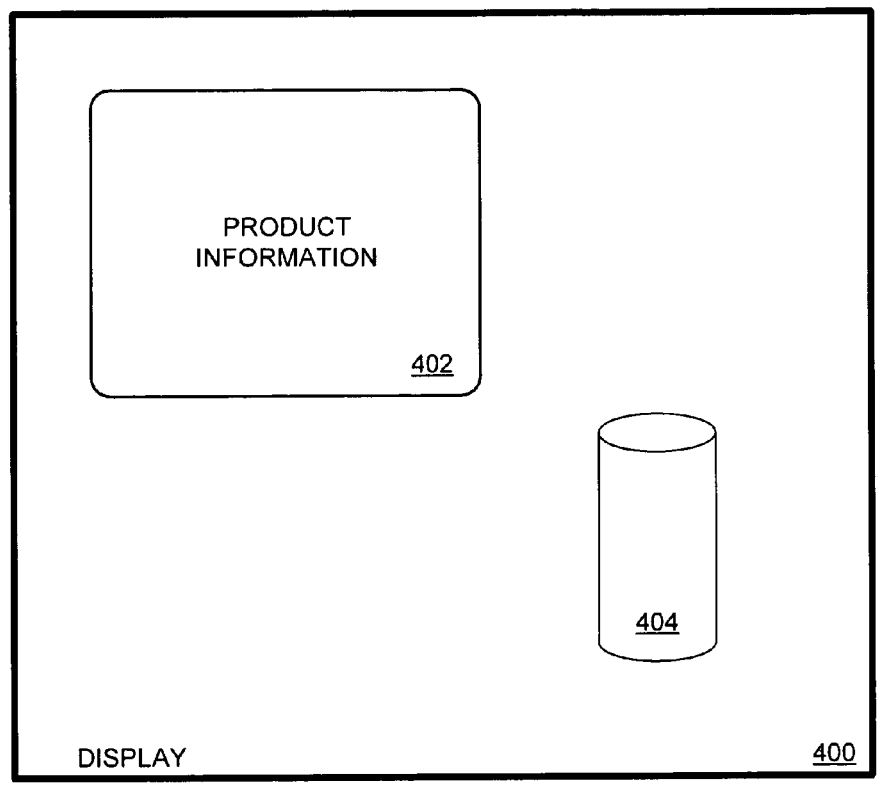
FIG. 4 is a diagram illustrating an example display in a system for facilitating purchases associated with video programming.
Figure 5:
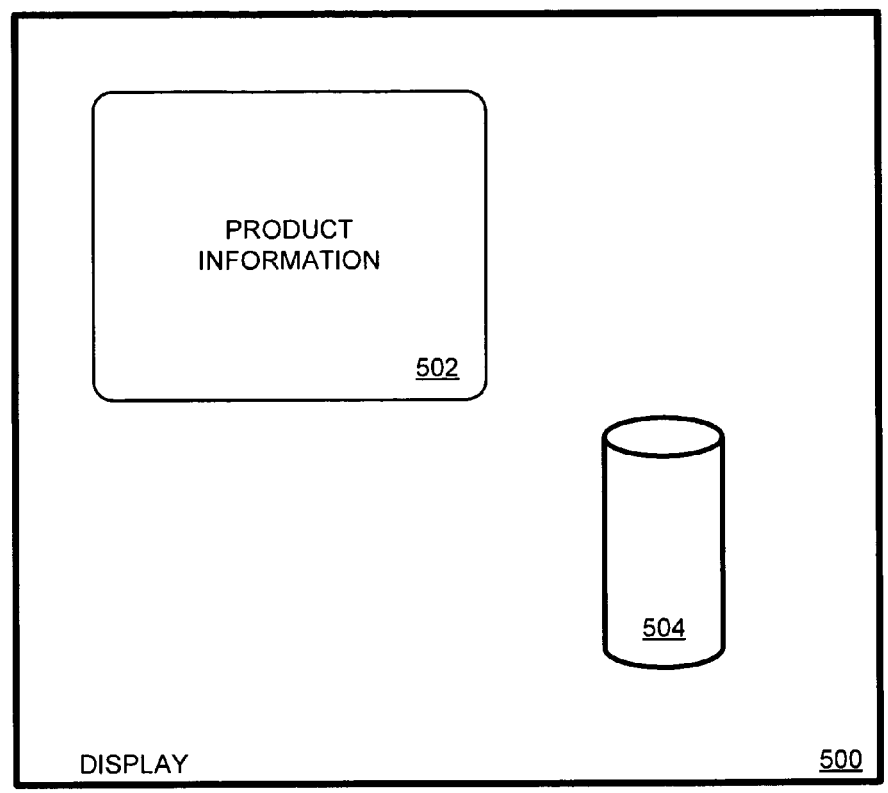
FIG. 5 is a diagram illustrating an example display in a system for facilitating purchases associated with video programming.

In other embodiments, user interface 104 may include a pause selector. When the user activates the pause selector, remote control 102 transmits a pause command to electronic device 106. In one embodiment, when electronic device 106 receives the pause command, it responds by pausing the video programming and transmitting information corresponding to a current product to display 108. This allows the user to both pause the video programming and to obtain further product information in order to make their purchase decision. FIGS. 4 and 5 illustrate examples of product information shown within display 108.

In another embodiment, when electronic device 106 receives the pause command, it responds by pausing the video programming and transmitting a list of products available for purchase to display 108. This allows the user to both pause the video programming and to see a list of some or all of the products available that are associated with the video programming.

In a further embodiment, user interface 104 includes a play selector. When the user activates the play selector while a product is highlighted from the list of some or all of the products available, remote control 102 transmits a play command to electronic device 106. When electronic device 106 receives the play command, it responds by playing a portion of the video programming corresponding to the selected product. This allows the user to see the portion of the video programming where the product appears to help in their purchasing decision.

In another embodiment, user interface 104 includes a select selector. When the user activates the select selector while a product is highlighted from the list of some or all of the products available, remote control 102 transmits a select command to electronic device 106. When electronic device 106 receives the select command it responds by placing the highlighted product in the selected product list, allowing the user to purchase the selected product.

Figure 2:
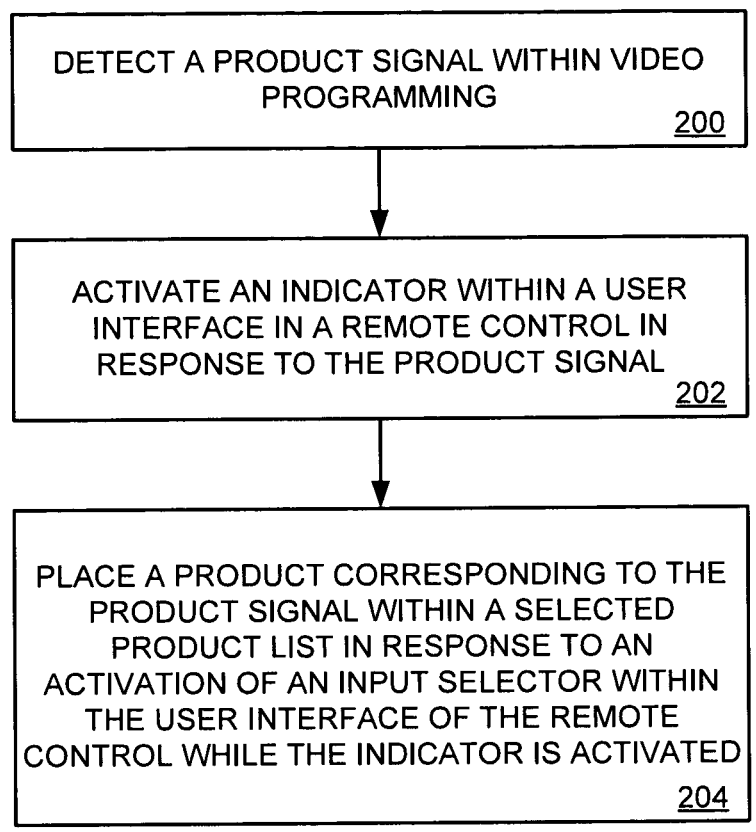
FIG. 2 is a flow chart illustrating a method of facilitating purchases associated with video programming.

FIG. 2 is a flow chart illustrating a method of facilitating purchases associated with video programming. In this embodiment, electronic device 106 detects a product signal within or related to video programming (operation 200). In response to the product signal, electronic device 106 activates an indicator within user interface 104 of remote control 102 (operation 202). Depending on the embodiment, the indicator may be a liquid crystal display, a light emitting diode, or the like within user interface 104 of remote control 102.

In response to an activation of an input selector within user interface 104 of remote control 102, electronic device 106 places a product corresponding to the product signal within a selected item list (operation 204). In one embodiment, electronic device 106 highlights the product within the video programming in response to an activation of the input selector while the indicator is activated. FIG. 5 illustrates an example of product highlighting within the video programming.

In another embodiment, electronic device 106 displays the contents of the selected item list at a conclusion of the video programming.

Figure 3:
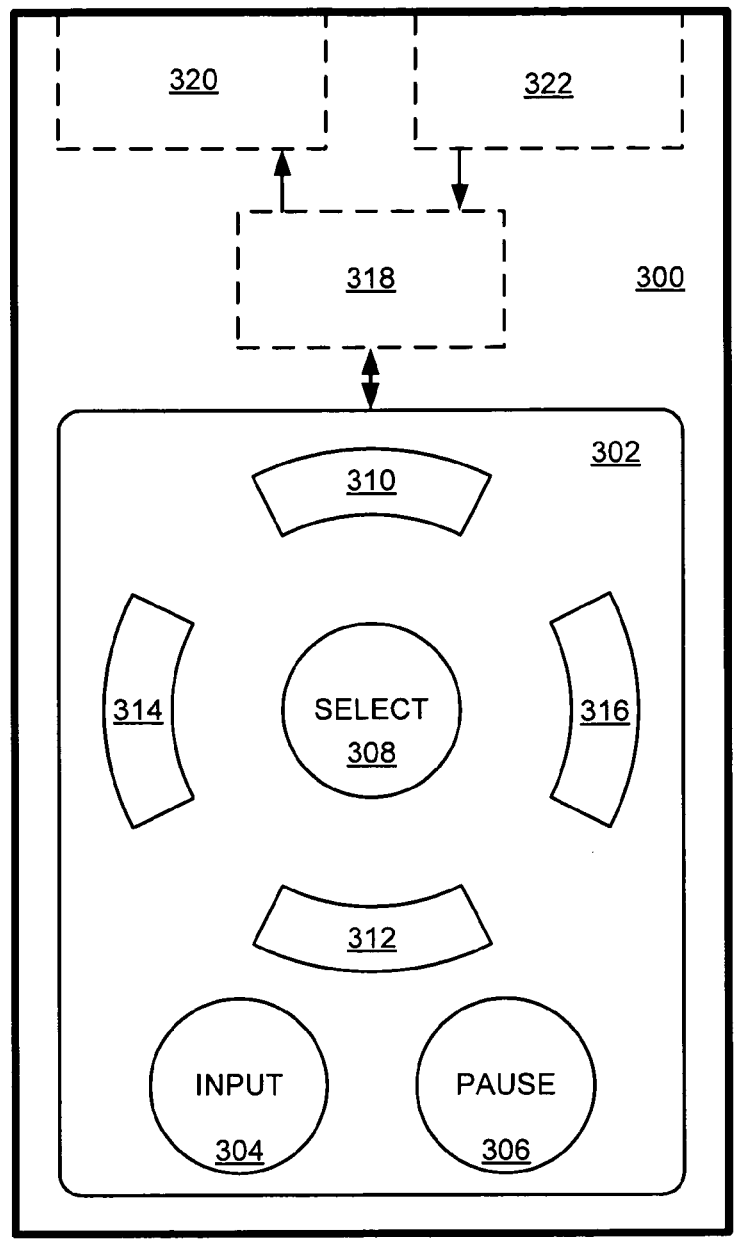
FIG. 3 is a diagram illustrating a remote control configured to facilitate purchases associated with video programming.

FIG. 3 is a diagram illustrating remote control 300 configured to facilitate purchases associated with video programming. In this embodiment, remote control 300 includes user interface 302, remote control processing system 318, transmitter 320, and receiver 322. User interface 302 includes up 310, down 312, left 314, and right 316 navigation selectors, along with select 308, input 304, and pause 306 selectors.

In this example, user interface 302 may be any combination of displays and selectors capable of displaying an indicator to a user, and of receiving selections from a user. For example, user interface 302 may include a touch screen, a quantity of buttons, a scroll wheel, and the like. Remote control processing system 318 may be any processing system capable of receiving commands from receiver 322, transmitting commands to transmitter 320, and interfacing with and controlling user interface 302. In some examples, remote control processing system 318 may be a microprocessor configured to execute software or firmware instructions, and application specific integrated circuit (ASIC), or the like.

Transmitter 320 may be any transmitter capable of receiving commands from remote control processing system 318, and transmitting the commands to an electronic device. Receiver 322 may be any receiver capable of receiving commands from an electronic device, and transmitting the commands to remote control processing system 318. Transmitter 320 and receiver 322 may be wired or wireless. For example, they may communicate using infrared (IR) or radio frequency (RF) signaling, or the like.

In an example, remote control 300 is configured to receive a purchase opportunity command from an electronic device through the receiver 322. In response to the purchase opportunity command, remote control 300 activates an indicator within user interface 302. If a user activates input selector 304, remote control 300 transmits a purchase command to the electronic device through the transmitter.

In some examples, input selector 304 is a button and the indicator device is enclosed within the input selector. In such an example, the indicator device may be a light emitting diode.

FIG. 4 is a diagram illustrating an example display 400 in a system for facilitating purchases associated with video programming. In this example display 400, product 404 appears along with detailed product information 402 displayed in response to activation of a pause selector on a remote control as described above.

FIG. 5 is a diagram illustrating an example display 500 in a system for facilitating purchases associated with video programming. In this example display 500, product 504 is the same as product 404 from FIG. 4; however, it has now been highlighted in response to activation of an input selector while the indicator is activated as described above.

Figure 6:
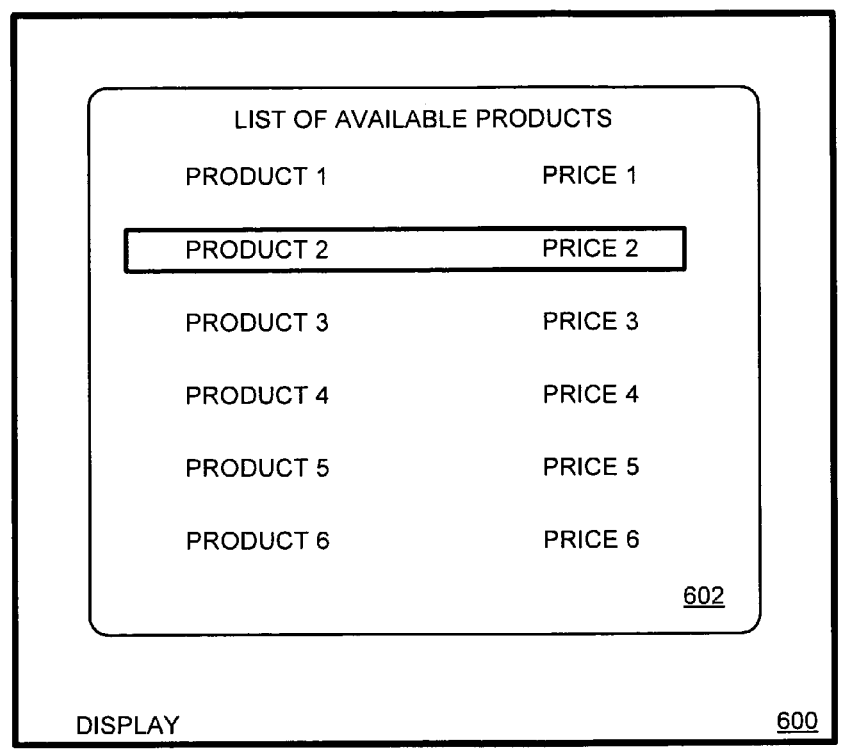
FIG. 6 is a diagram illustrating an example display in a system for facilitating purchases associated with video programming.

FIG. 6 is a diagram illustrating an example display 600 in a system for facilitating purchases associated with video programming. This example display 600 includes a list of available products 602 where product 2, which is available at price 2, has been highlighted by a user using navigation controls on a user interface of a remote control.

Figure 7:
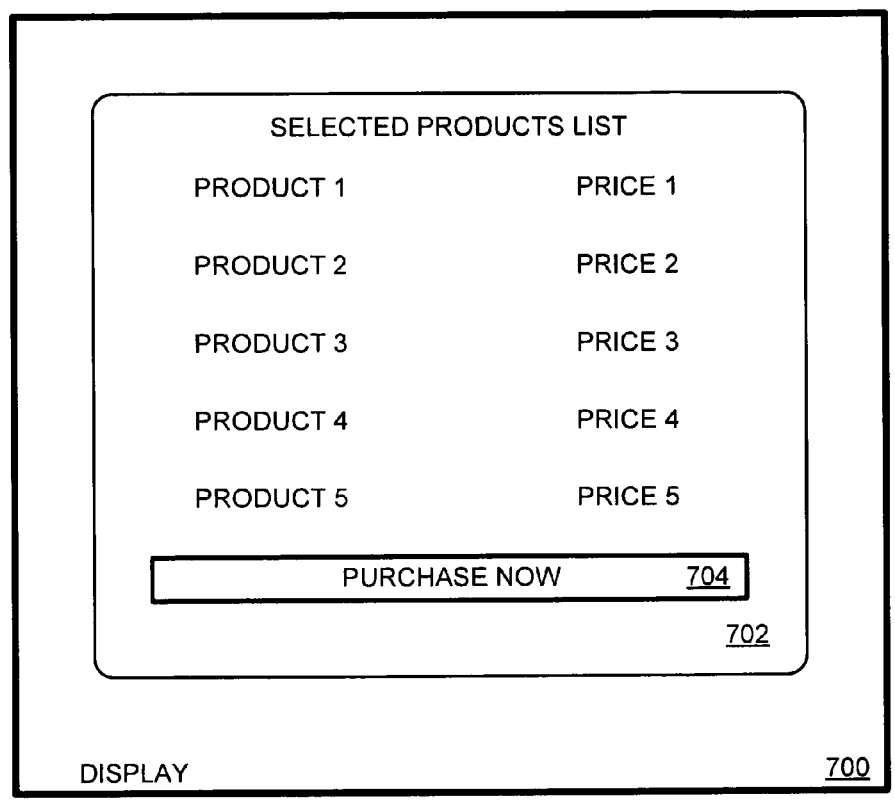
FIG. 7 is a diagram illustrating an example display in a system for facilitating purchases associated with video programming.

FIG. 7 is a diagram illustrating an example display 700 in a system for facilitating purchases associated with video programming. This example display 700 illustrates selected products list 702. Selected products list 702 includes a purchase now indicator 704 which the user has highlighted. When the user selects the purchase now indicator 704, products 1 through 5 are purchased at prices 1 through 5. This purchase may be completed in any of a wide variety of methods. For example, the user may enter credit card information on another screen, or the charge may be added to the user's satellite programming bill, or the like.

Figure 8:
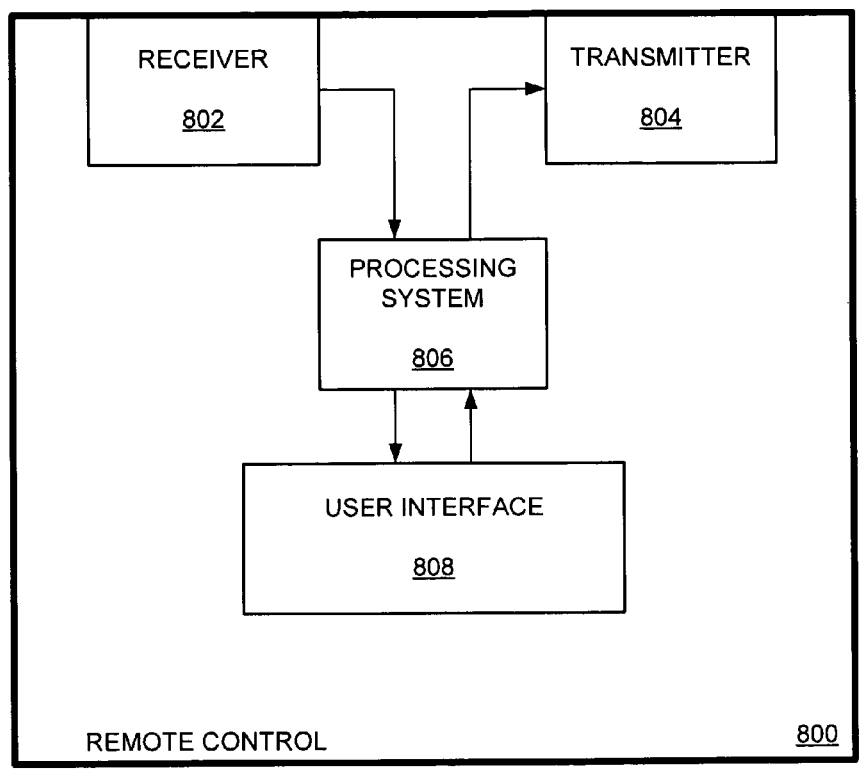
FIG. 8 is a block diagram illustrating a remote control configured to facilitate purchases associated with video programming.

FIG. 8 is a block diagram illustrating remote control 800 configured to facilitate purchases associated with video programming. In this example, remote control 800 includes receiver 802, transmitter 804, remote control processing system 806 and user interface 808.

In this example, user interface 808 may be any combination of displays and selectors capable of displaying an indicator to a user, and of receiving selections from a user. For example, user interface 808 may include a touch screen, a quantity of buttons, a scroll wheel, and the like. Remote control processing system 806 may be any processing system capable of receiving commands from receiver 802, transmitting commands to transmitter 804, and interfacing with and controlling user interface 808. In some examples, remote control processing system 806 may be a microprocessor, an application specific integrated circuit (ASIC), or the like.

Transmitter 804 may be any transmitter capable of receiving commands from remote control processing system 806, and transmitting the commands to an electronic device. Receiver 802 may be any receiver capable of receiving commands from an electronic device, and transmitting the commands to remote control processing system 806. Transmitter 804 and receiver 802 may be wired or wireless. For example, they may communicate using infrared (IR) or radio frequency (RF) signaling, or the like.

In an example, remote control 800 is configured to receive a purchase opportunity command from an electronic device through receiver 802. In response to the purchase opportunity command, remote control 800 activates an indicator within user interface 808. If a user activates an input selector, remote control 800 transmits a purchase command to the electronic device through transmitter 804.

Figure 9:
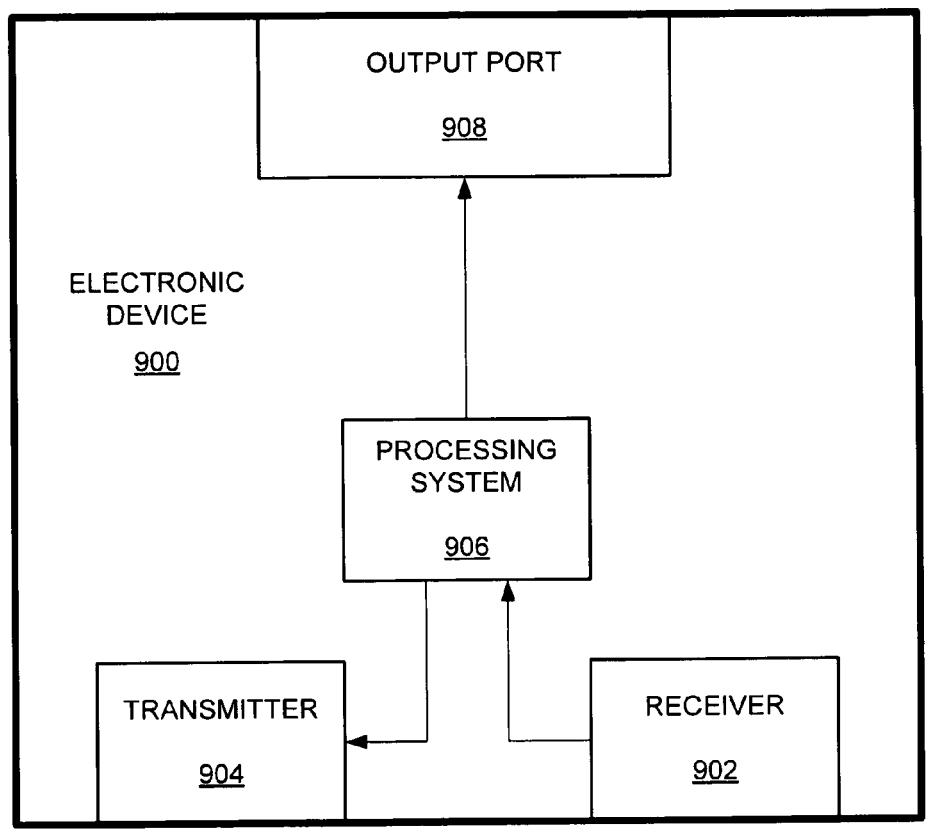
FIG. 9 is a block diagram illustrating an electronic device configured to facilitate purchases associated with video programming.

FIG. 9 is a block diagram illustrating electronic device 900 configured to facilitate purchases associated with video programming. In this example, electronic device 900 includes receiver 902, transmitter 904, electronic device processing system 906, and output port 908.

Electronic device processing system 906 may be any processing system capable of receiving commands from receiver 902, transmitting commands to transmitter 904, and transmitting video programming and video data to a display through output port 908. In some examples, remote control processing system 906 may be a microprocessor, an application specific integrated circuit (ASIC), or the like.

Transmitter 904 may be any transmitter capable of receiving commands from electronic device processing system 906, and transmitting the commands to a remote control. Receiver 902 may be any receiver capable of receiving commands from a remote control, and transmitting the commands to electronic device processing system 906. Transmitter 904 and receiver 902 may be wired or wireless. For example, they may communicate using infrared (IR) or radio frequency (RF) signaling, or the like.

In an example, electronic device processing system 906 is configured to detect a product signal in or related to video programming corresponding to a product associated with the video programming. In response to the product signal, electronic device processing system 906 transmits a purchase opportunity command to a remote control through transmitter 904.

Electronic device processing system 906 is also configured to receive a purchase command from the remote control through receiver 902, and to place the product in a selected product list in response to the purchase command. In some examples, the product is a copy of the video programming, a soundtrack to the video programming, or the like. In other examples, the product may be clothing shown in the video programming.

In some embodiments, electronic device 900 is configured to highlight the product on the display in response to the purchase command. In other embodiments, electronic device 900 is configured to display the contents of the selected product list at a conclusion of the video programming.

In further examples, electronic device 900 is configured to receive a pause command from the remote control, and in response to the pause command, to pause the video programming, and to transmit information corresponding to the product to the display. In other examples, electronic device 900 is configured to receive a pause command from the remote control, and in response to the pause command, to pause the video programming, and to transmit a list of some or all of the products available for purchase to the display.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A system for facilitating purchases associated with video programming comprising:
    an electronic device configured to send video programming to a display; and
    a remote control comprising:
        a remote control processing system;
        a user interface coupled with the remote control processing system configured to receive user interface commands from the remote control processing system, and to send user commands to the remote control processing system;
        a receiver coupled with the remote control processing system and configured to receive electronic device commands from the electronic device and send the electronic device commands to the remote control processing system; and
        a transmitter coupled with the remote control processing system and configured to receive remote control commands from the remote control processing system and to send the remote control commands to the electronic device;
    wherein the user interface comprises an indicator, a pause selector, and an input selector both coupled with the remote control processing system;
    wherein the electronic device is configured to detect a product signal related to the video programming corresponding to a product associated with the video programming, transmit a purchase opportunity command to the remote control in response to the product signal, receive a purchase command from the remote control, and place the product in a selected product list in response to the purchase command; wherein the remote control processing system is configured to receive the purchase opportunity command from the electronic device through the receiver, activate the indicator in the user interface in response to the purchase opportunity command, and transmit the purchase command through the transmitter to the electronic device in response to an activation of the input selector indicating selection the product for purchase, wherein the activation of the input selector is available in response to the activation of the indicator;
    wherein the remote control processing system is also configured to transmit a pause command to the electronic device through the transmitter in response to activation of the pause selector; and
    wherein the electronic device is also configured to receive the pause command from the remote control, pause the video programming as a result of the pause command, and to automatically transmit a list of products available for purchase to the display in response to the pause command.

2. The system of claim 1, wherein the remote control processing system is configured to transmit the pause command to the electronic device through the transmitter in response to activation of the pause selector while the indicator is activated; and wherein the electronic device is configured to receive the pause command from the remote control, to pause the video programming, and to transmit information corresponding to the product to the display in response to the pause command.

3. The system of claim 1, wherein the remote control also comprises a play selector;
    wherein the remote control processing system is configured to transmit a play command to the electronic device through the transmitter in response to activation of the play selector while a product within the list of products available for purchase is highlighted; and
    wherein the electronic device is configured to receive the play command from the remote control, and play a portion of the video programming corresponding to the selected product in response to the play command.

4. The system of claim 1, wherein the remote control also comprises a select selector;
    wherein the remote control processing system is configured to transmit a select command to the electronic device in response to activation of the select selector while a product within the list of products available for purchase is highlighted; and
    wherein the electronic device is configured to receive the select command from the remote control, and place the highlighted product in the selected product list in response to the select command.

5. The system of claim 1, wherein the electronic device is configured to display the contents of the selected product list at a conclusion of the video programming.

6. An electronic device for facilitating purchases associated with video programming comprising:
  an electronic device processing system;
  a receiver coupled with the electronic device processing system, configured to receive commands from a remote control; a transmitter coupled with the electronic device processing system, configured to transmit commands to the remote control; and
  an output port coupled with the electronic device processing system, configured to send video programming to a display;
  wherein the electronic device processing system is configured to:
    detect a product signal related to the video programming corresponding to a product associated with the video programming; transmit a purchase opportunity command to the remote control in response to the product signal through the transmitter;
    receive a purchase command from the remote control through the receiver wherein the purchase command is transmitted by the remote control in response to an activation of an input selector;
    place the product in a selected product list in response to the purchase command;
    receive a pause command from the remote control; and
    pause the video programming, and transmit information corresponding to the product to the display in response to the pause command.

7. The electronic device of claim 6, wherein the product is a copy of the video programming.

8. The electronic device of claim 6, wherein the product is clothing shown in the video programming.

9. The electronic device of claim 6, wherein the electronic device is configured to highlight the product on the display in response to the purchase command.

10. The electronic device of claim 6, wherein the electronic device is configured to display the contents of the selected product list at a conclusion of the video programming.

11. The electronic device of claim 6, wherein the electronic device is configured to receive a pause command from the remote control, to pause the video programming, and to transmit a list of products available for purchase to the display in response to the pause command.

12. The electronic device of claim 6, wherein the electronic device is configured to receive a play command from the remote control, and to play a portion of the video programming corresponding to the selected product in response to the play command.

13. A remote control for facilitating purchases associated with video programming comprising:
  a remote control processing system;
  a user interface coupled with the remote control processing system;
  a receiver coupled with the remote control processing system configured to receive electronic device commands from an electronic device and send the electronic device commands to the remote control processing system; and
  a transmitter coupled with the remote control processing system configured to receive remote control commands from the remote control processing system and send the remote control commands to the electronic device;
  wherein the user interface comprises an indicator, a pause selector, and an input selector; and
  wherein the remote control processing system is configured to:
    receive a purchase opportunity command from the electronic device through the receiver;
    activate the indicator in response to the purchase opportunity command;
    transmit a purchase command to the electronic device through the transmitter in response to an activation of the input selector indicating selection the product for purchase, wherein the activation of the input selector is made available in response to the activation of the indicator; and
    transmit a pause command to the electronic device through the transmitter as a result of an activation of the pause selector, pause the video programming as a result of the pause command, and automatically transmit a list of products available for purchase to the display as a result of the pause command.

14. The remote control of claim 13, wherein the input selector is a button, and the indicator device is enclosed within the input selector.

15. The remote control of claim 14, wherein the indicator device is a light emitting diode.

16. The remote control of claim 13, wherein the user interface is a touch screen.

17. A method for facilitating a purchase associated with video programming, the method comprising:
  in an electronic device, detecting a product signal related to video programming;
  activating an indicator within a user interface in a remote control in response to the product signal; and
  in the electronic device, placing a product corresponding to the product signal within a selected item last in response to an activation of an input selector within the user interface of the remote control; and
  in the electronic device, automatically transmitting a list of products available for purchase to a display as a result of an activation of a pause selector within the user interface of the remote control and pausing the video programming as a result of the activation of the pause selector.

18. The method of claim 17, further comprising: highlighting the product within the video programming in response to activation of the input selector while the indicator is activated.

19. The method of claim 17, further comprising: displaying contents of the selected item list at a conclusion of the video programming.

20. The method of claim 17, wherein the indicator is a liquid crystal display.

21. A system for facilitating purchases associated with video programming comprising:
  an electronic device configured to send video programming to a display; and
  a remote control comprising:
    a remote control processing system;
    a user interface coupled with the remote control processing system configured to receive user interface commands from the remote control processing system, and to send user commands to the remote control processing system;
    a receiver coupled with the remote control processing system and configured to receive electronic device commands from the electronic device and send the electronic device commands to the remote control processing system; and
    a transmitter coupled with the remote control processing system and configured to receive remote control commands from the remote control processing system and to send the remote control commands to the electronic device;

wherein the user interface comprises an indicator, a pause selector, and an input selector both coupled with the remote control processing system;

wherein the electronic device is configured to detect a product signal related to the video programming corresponding to a product associated with the video programming, transmit a purchase opportunity command to the remote control in response to the product signal, receive a purchase command from the remote control, and in response to the purchase command, place the product in a selected product list that includes other products selected for purchase; wherein the remote control processing system is configured to receive the purchase opportunity command from the electronic device through the receiver, activate the indicator in the user interface in response to the purchase opportunity command, and transmit the purchase command through the transmitter to the electronic device in response to an activation of the input selector indicating selection the product for purchase;

wherein the remote control processing system is also configured to transmit a pause command to the electronic device through the transmitter in response to activation of the pause selector; and wherein the electronic device is also configured to receive the pause command from the remote control, pause the video programming as a result of the pause command, and to automatically transmit a list of products available for purchase to the display as a result of the pause command.

22. The system of claim 21 wherein the product is made available for purchase only during the time that the indicator is active.

23. The system of claim 22 wherein the product is made available for purchase any time after the indicator has been activated.

\* \* \* \* \*